US010602221B2

(12) United States Patent
Gutterman et al.

(10) Patent No.: US 10,602,221 B2
(45) Date of Patent: Mar. 24, 2020

(54) SET TOP BOX SECURITY TRACKING

(71) Applicant: Charter Communications Operating, LLC, St. Louis, MO (US)

(72) Inventors: Jeff Gutterman, Weldon Springs, MO (US); Ryan Crews, Hendersonville, TN (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 15/969,960

(22) Filed: May 3, 2018

(65) Prior Publication Data
US 2019/0342613 A1  Nov. 7, 2019

(51) Int. Cl.
*H04N 21/442* (2011.01)
*H04N 17/00* (2006.01)

(52) U.S. Cl.
CPC ..... *H04N 21/44245* (2013.01); *H04N 17/004* (2013.01); *H04N 21/44209* (2013.01)

(58) Field of Classification Search
CPC ........... H04N 21/44245; H04N 17/004; H04N 21/44209; H04N 17/04; H04N 17/06; H04N 17/00
See application file for complete search history.

(56) References Cited

U.S. PATENT DOCUMENTS

| | | | |
|---|---|---|---|
| 7,272,846 B2 | 9/2007 | Williams et al. | |
| 7,512,969 B2 | 3/2009 | Gould et al. | |
| 7,694,323 B2 | 4/2010 | LaJoie et al. | |
| 7,792,963 B2 | 9/2010 | Gould | |
| 8,931,022 B2 | 1/2015 | Lajoie et al. | |
| 2003/0056217 A1 | 3/2003 | Brooks | |
| 2005/0033986 A1* | 2/2005 | Ramarao | H04L 9/00 |
| 2005/0155069 A1* | 7/2005 | LaJoie | H04N 7/18 |
| 2005/0183130 A1* | 8/2005 | Sadja | H04N 7/173 |
| 2005/0289585 A1* | 12/2005 | Pedlow | H04N 7/16 |
| 2006/0130107 A1 | 6/2006 | Gonder | |
| 2007/0076705 A1* | 4/2007 | Semon | H04L 12/56 |

(Continued)

OTHER PUBLICATIONS

Alikipedia, CableCARD, downloaded Mar. 16, 2018 from https://en.wikipedia.org/wiki/CableCARD, pp. 1-8.

(Continued)

*Primary Examiner* — Anthony Bantamoi
(74) *Attorney, Agent, or Firm* — Otterstedt, Wallace & Kammer, LLP

(57) ABSTRACT

A plurality of customer premises equipment devices in a broadband network are periodically polled to determine a corresponding upstream interface port for each of the plurality of customer premises equipment devices. The determined corresponding upstream interface ports for each of the plurality of customer premises equipment devices are compared to stored data indicating authorized upstream interface ports for each of the plurality of customer premises equipment devices. Responsive to the comparing indicating that at least one of the determined corresponding upstream interface ports does not match a corresponding one of the authorized upstream interface ports, at least one remedial action is taken for a customer account associated with a corresponding one of the customer premises equipment devices in the broadband network.

30 Claims, 12 Drawing Sheets

(56) References Cited

U.S. PATENT DOCUMENTS

2007/0217436 A1     9/2007  Markley
2009/0248794 A1    10/2009  Helms
2010/0011094 A1*    1/2010  Ver Steeg ............ G06F 15/177
2010/0313236 A1    12/2010  Straub

OTHER PUBLICATIONS

Wikipedia, Simple Network Management Protocol, downloaded Feb. 2, 2018 from https://en.wikipedia.org/wiki/Simple_Network_Management_Protocol, pp. 1-13.
Cable Television Laboratories, Inc., Data-Over-Cable Service Interface Specifications DOCSIS Set-top Gateway (DSG) Interface Specification CM-SP-DSG-I25-170906, Sep. 6, 2017 Cover pp. i-viii, pp. 1-145.
Arris, Digital Addressable Controller DAC6000, downloaded Feb. 2, 2018 from http://www.arris.com/products/dac6000-digital-addressable-controller/, pp. 1-5.

* cited by examiner

| MA | InterNode | Poll Time | Account | MAC | CMTS | IFDESCR | SI Description |
|---|---|---|---|---|---|---|---|
| California | outer | Wed Nov 01 13:39:52 CST 2017 | 123123123 | 001C115D46A4 | cts03glryca | cable-mac 55 | Set-Top-Box |
| California | outer | Wed Nov 01 13:39:52 CST 2017 | 123123123 | 001E5AD61734 | cts03glryca | cable-mac 48 | Set-Top-Box |
| California | outer | Wed Nov 01 13:39:52 CST 2017 | 123123123 | 001FC454753C | cts03glryca | cable-mac 48 | Set-Top-Box |

*FIG. 12*

SET TOP BOX SECURITY TRACKING

FIELD OF THE INVENTION

The present invention relates generally to the electrical, electronic, and computer arts, and more particularly relates to security tracking of set top boxes and other customer premises equipment (CPE) in broadband networks and the like.

BACKGROUND OF THE INVENTION

Cable television is a system of delivering television programming to paying subscribers via radio frequency (RF) signals transmitted through coaxial cables, or in more recent systems, light pulses through fiber-optic cables. Historically, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber/coax networks (HFCs) using optical fiber from the head end to the demarcation with the subscriber coax (usually at a fiber node). Currently, a content-based network, a non-limiting example of which is a cable television network, may afford access to a variety of services including television, broadband Internet access, telephone service, and the like. There are also fiber networks for fiber to the home (FTTH) deployments (also known as fiber to the premises or FTTP.

One significant issue for a cable operator desiring to provide digital service is the configuration of its network. Designed for one-way delivery of broadcast signals, the existing cable network topology was optimized for downstream only (i.e., towards the subscriber) service. New equipment had to be added to the network to provide two-way communication. To reduce the cost of this equipment and to simplify the upgrade of the broadcast cable for two-way digital traffic, standards were developed for a variety of new cable-based services. The first of these standards, the Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and may be referred to at some points herein in capital letters, without the ® symbol, for convenience.

There are many types of IP networks besides cable networks. Other wired IP networks include, for example, digital subscriber line (DSL), fiber to the home, fiber to the curb, and so on. Wireless IP networks include Wi-Fi, wireless ISP (Internet Service Provider), WiMAX, satellite interne, and mobile broadband.

One issue of concern to the operators of broadband networks is the unauthorized relocation of CPE devices (e.g., "cable boxes," "set-top boxes" or STBs). For example, an unscrupulous individual might make unauthorized use of a STB. Prior approaches have focused on human intervention, detection of "rogue" devices with duplicate MAC addresses, and detection of "heartbeat" signals from a device.

SUMMARY OF THE INVENTION

Techniques are provided for set top box security tracking.

In one aspect, an exemplary method includes periodically polling a plurality of customer premises equipment devices in a broadband network to determine a corresponding upstream interface port for each of the plurality of customer premises equipment devices; comparing the determined corresponding upstream interface ports for each of the plurality of customer premises equipment devices to stored data indicating authorized upstream interface ports for each of the plurality of customer premises equipment devices; and, responsive to the comparing indicating that at least one of the determined corresponding upstream interface ports does not match a corresponding one of the authorized upstream interface ports, taking at least one remedial action for a customer account associated with a corresponding one of the customer premises equipment devices in the broadband network.

In another aspect, another exemplary method includes periodically polling a plurality of customer premises equipment devices in a broadband network to determine a corresponding upstream interface port for each of the plurality of customer premises equipment devices; comparing the determined corresponding upstream interface ports for each of the plurality of customer premises equipment devices to determined corresponding upstream interface ports for one or more of the plurality of customer premises equipment devices previously collocated therewith under a common account; and, responsive to the comparing indicating that at least one of the determined corresponding upstream interface ports does not match the determined corresponding upstream interface ports for one or more of the plurality of customer premises equipment devices previously collocated therewith under the common account, taking at least one remedial action for a customer account associated with a corresponding one of the customer premises equipment devices in the broadband network.

In still another aspect, an exemplary poller includes a memory, at least one processor coupled to the memory, and a non-transitory computer readable medium including computer executable instructions (e.g. one or more software and/or firmware modules) which when loaded into the memory configure the at least one processor to cause the at least one processor to be operative to carry out or otherwise facilitate any one, some or all of the method steps described herein in connection with any of the methods described herein.

In a further aspect, an exemplary system includes a data warehouse; a plurality of ported units each including at least one of a cable modem termination system and digital video access equipment; and a poller, similar to that just described, downstream of the data warehouse and upstream of the plurality of ported units. The poller is configured to carry out or otherwise facilitate any one, some or all of the method steps described herein in connection with any of the methods described herein, in cooperation with the other elements.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., server(s), polling device(s), set-top box(es) or other CPE) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software and/or firmware module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide the ability to more efficiently and accurately identify inappropriately located CPE in broadband networks and the like.

These and other features and advantages of the present invention will become apparent from the following detailed description of illustrative embodiments thereof, which is to be read in connection with the accompanying drawings.

BRIEF DESCRIPTION OF THE DRAWINGS

FIG. 12 is a table showing an exemplary data set, in accordance with an aspect of the invention.

DETAILED DESCRIPTION OF PREFERRED EMBODIMENTS

Figure 1:
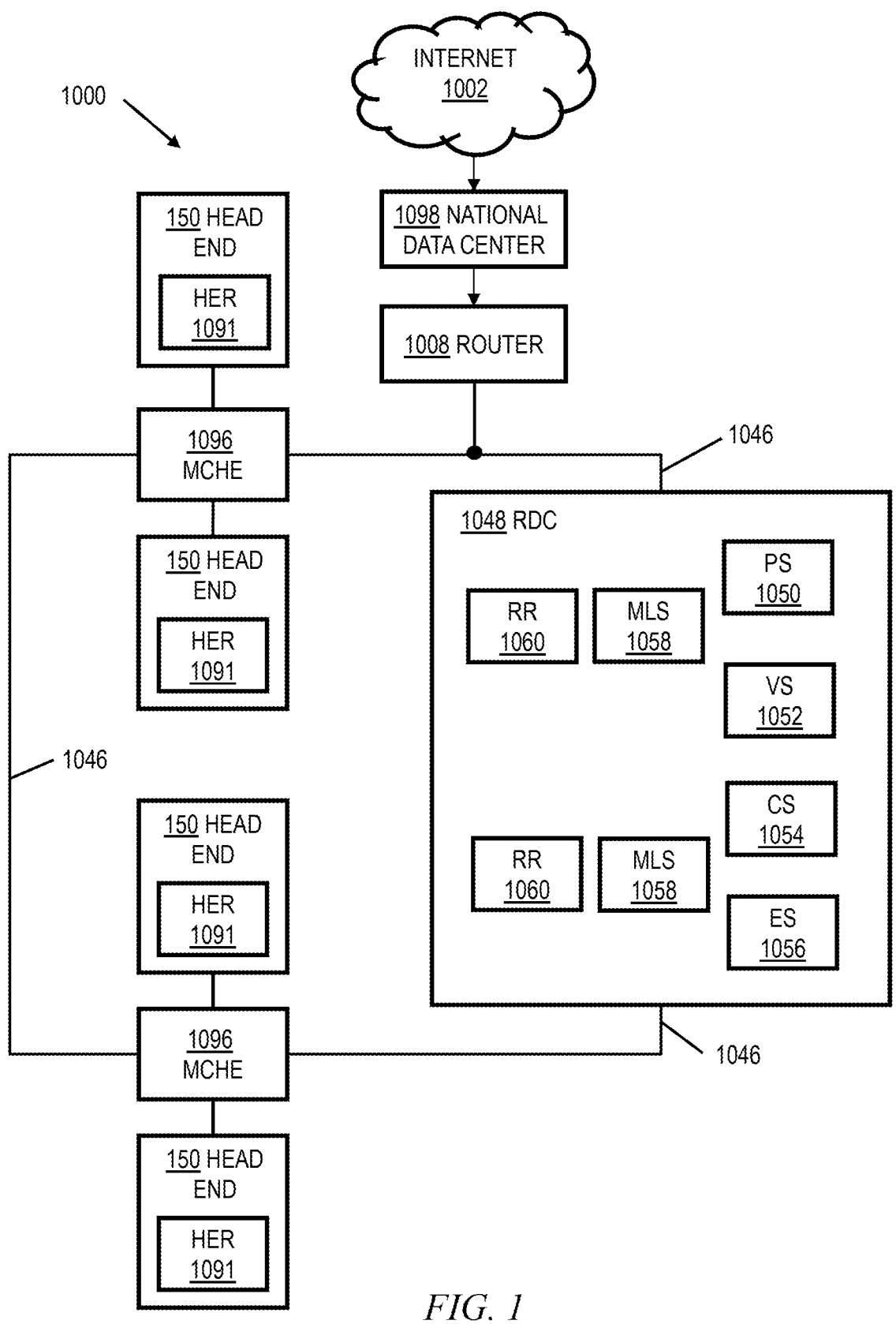
FIG. 1 is a block diagram of an exemplary embodiment of a system, within which one or more aspects of the invention can be implemented.

Purely by way of example and not limitation, some embodiments will be shown in the context of a cable multi-service operator (MSO) providing data services as well as entertainment services. FIG. 1 shows an exemplary system 1000, according to an aspect of the invention. System 1000 includes a regional data center (RDC) 1048 coupled to several Market Center Head Ends (MCHEs) 1096; each MCHE 1096 is in turn coupled to one or more divisions, represented by division head ends 150. In a non-limiting example, the MCHEs are coupled to the RDC 1048 via a network of switches and routers. One suitable example of network 1046 is a dense wavelength division multiplex (DWDM) network. The MCHEs can be employed, for example, for large metropolitan area(s). In addition, the MCHE is connected to localized HEs 150 via high-speed routers 1091 ("HER"=head end router) and a suitable network, which could, for example, also utilize DWDM technology. Elements 1048, 1096 on network 1046 may be operated, for example, by or on behalf of a cable MSO, and may be interconnected with a global system of interconnected computer networks that use the standardized Internet Protocol Suite (TCP/IP) (transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, Calif., USA.

Head end routers 1091 are omitted from figures below to avoid clutter, and not all switches, routers, etc. associated with network 1046 are shown, also to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends (local and/or market center) and/or regional data centers. For example, such an NDC might include one or more VOD servers; switched digital video (SDV) functionality; gateways to obtain content (e.g., program content) from various sources including cable feeds and/or satellite; and so on.

In some cases, there may be more than one national data center 1098 (e.g., two) to provide redundancy. There can be multiple regional data centers 1048. In some cases, MCHEs could be omitted and the local head ends 150 coupled directly to the RDC 1048.

Figure 2:
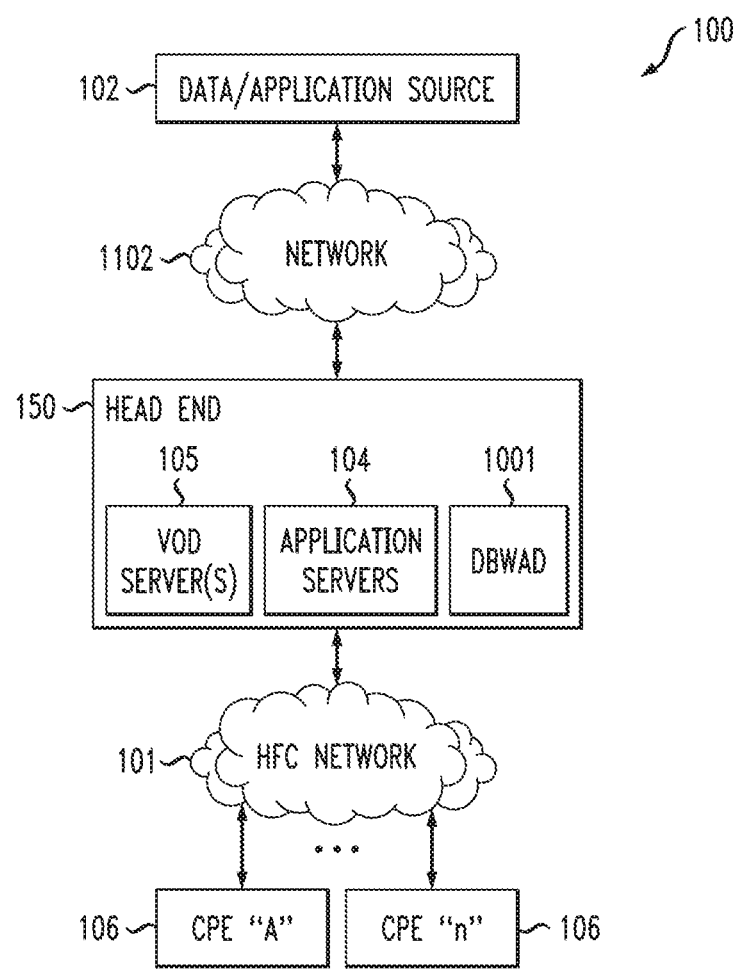
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE). The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

It should be noted that the exemplary CPE 106 is an integrated solution including a cable modem (e.g., DOCSIS) and one or more wireless routers. Other embodiments could employ a two-box solution; i.e., separate cable modem and routers suitably interconnected, which nevertheless, when interconnected, can provide equivalent functionality. Furthermore, FTTH networks can employ Service ONUs (S-ONUs; ONU=optical network unit) as CPE, as discussed elsewhere herein.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by the relevant upstream network components. Non-limiting examples of relevant upstream network components, in the context of the HFC network, include a distribution server 104 or a cable modem termination system 156 (discussed below with regard to FIG. 3). The skilled artisan will be familiar with other relevant upstream network components for other kinds of networks (e.g. FTTH) as discussed herein. Non-limiting examples of CPE are set-top boxes, high-speed cable modems, and Advanced Wireless Gateways (AWGs) for providing high bandwidth Internet access in premises such as homes and businesses. Reference is also made to the discussion of an exemplary FTTH network in connection with FIGS. 8 and 9.

Also included (for example, in head end 150) is a dynamic bandwidth allocation device (DBWAD) 1001 such as a global session resource manager, which is itself a non-limiting example of a session resource manager.

Figure 3:
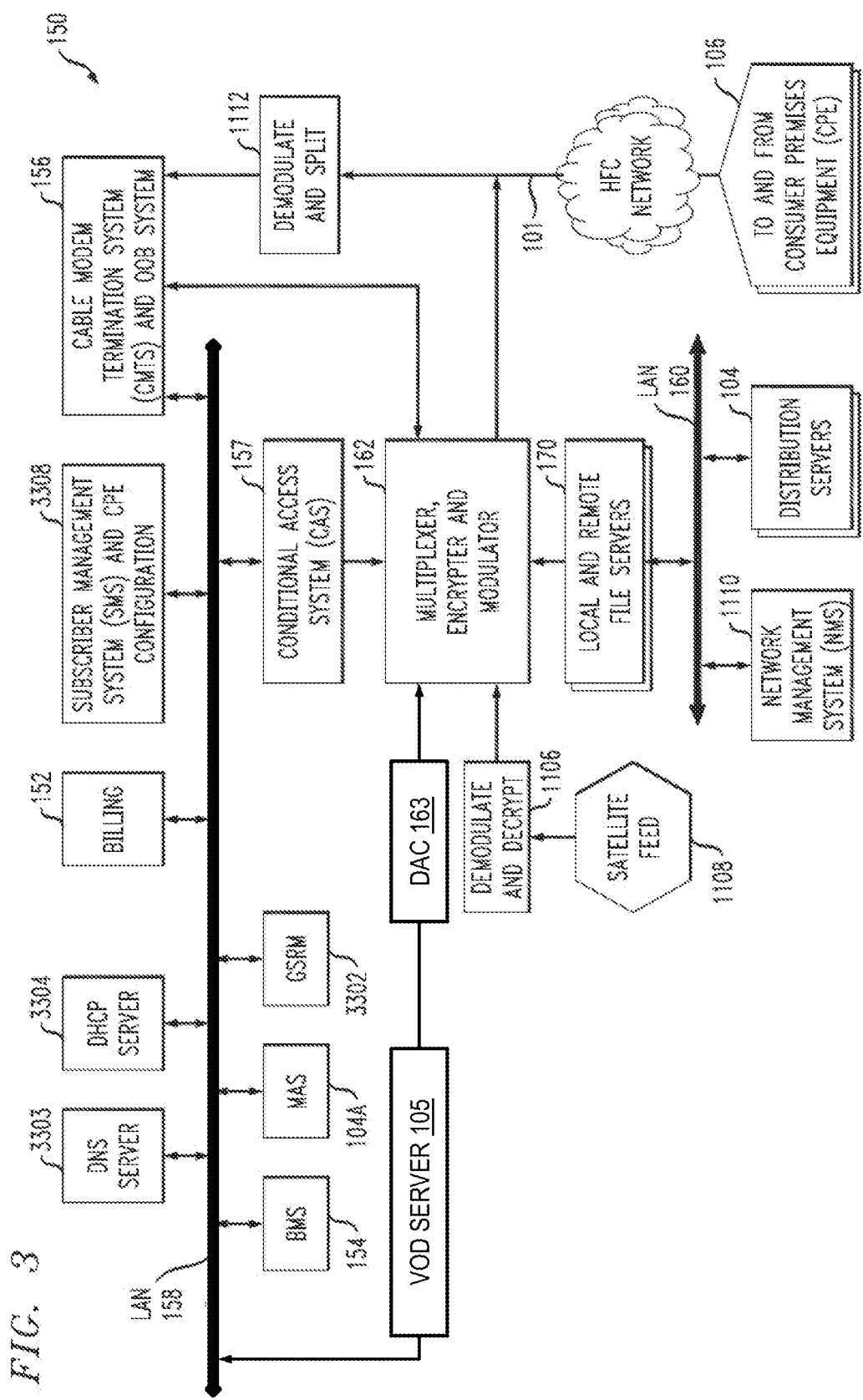
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols (e.g., DOCSIS 1.x, 2.0. or 3.0). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. HFC systems using DOCSIS to transmit data are one non-limiting exemplary application context for one or more embodiments. However, one or more embodiments are applicable to a variety of different kinds of networks.

It is also worth noting that the use of DOCSIS Provisioning of EPON (Ethernet over Passive Optical Network) or "DPoE" (Specifications available from CableLabs, Louisville, Colo., USA) enables the transmission of high-speed data over PONs using DOCSIS back-office systems and processes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more Dynamic Host Configuration Protocol (DHCP) server(s) 3304 can also be located where shown or in different locations.

Figure 4:
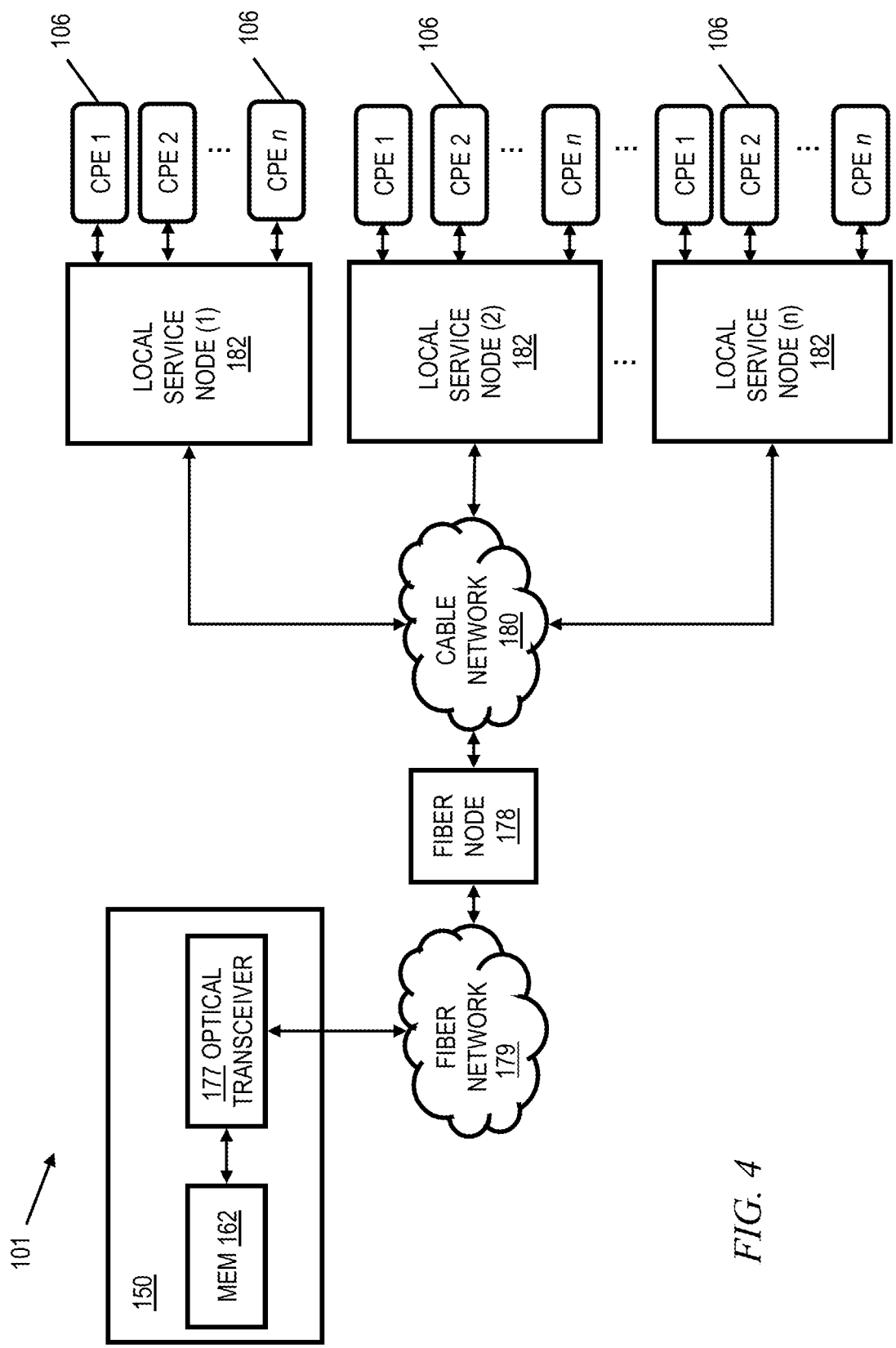
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network 179 to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number n of CPE 106 per node 182 may be different than the number n of nodes 182, and that different nodes may service different numbers n of CPE.

Certain additional aspects of video or other content delivery will now be discussed. It should be understood that embodiments of the invention have broad applicability to a variety of different types of networks. Some embodiments relate to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
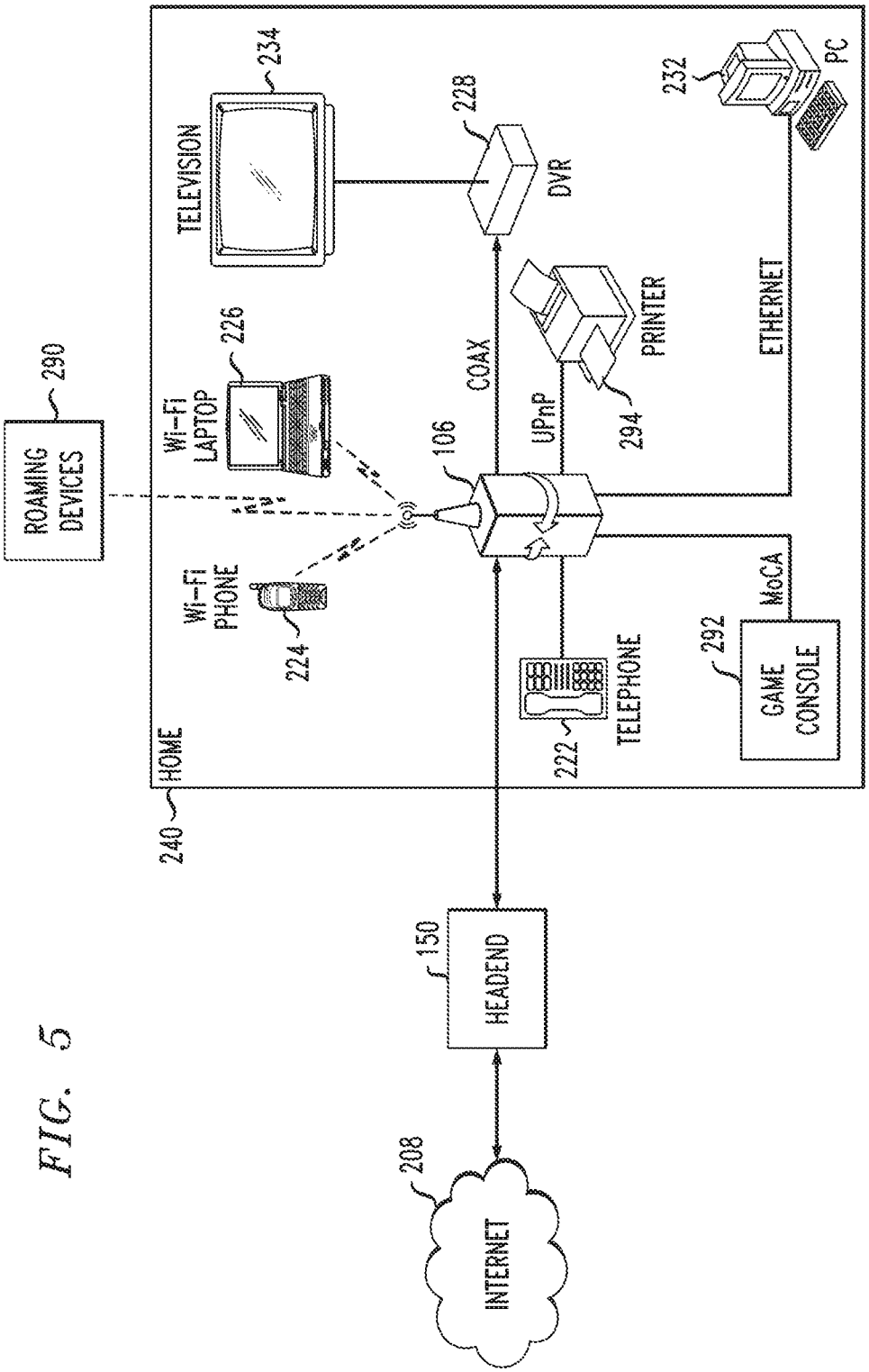
FIG. 5 is a functional block diagram of a premises network, including an exemplary centralized customer premises equipment (CPE) unit, interfacing with a head end such as that of FIG. 3.
Figure 6:
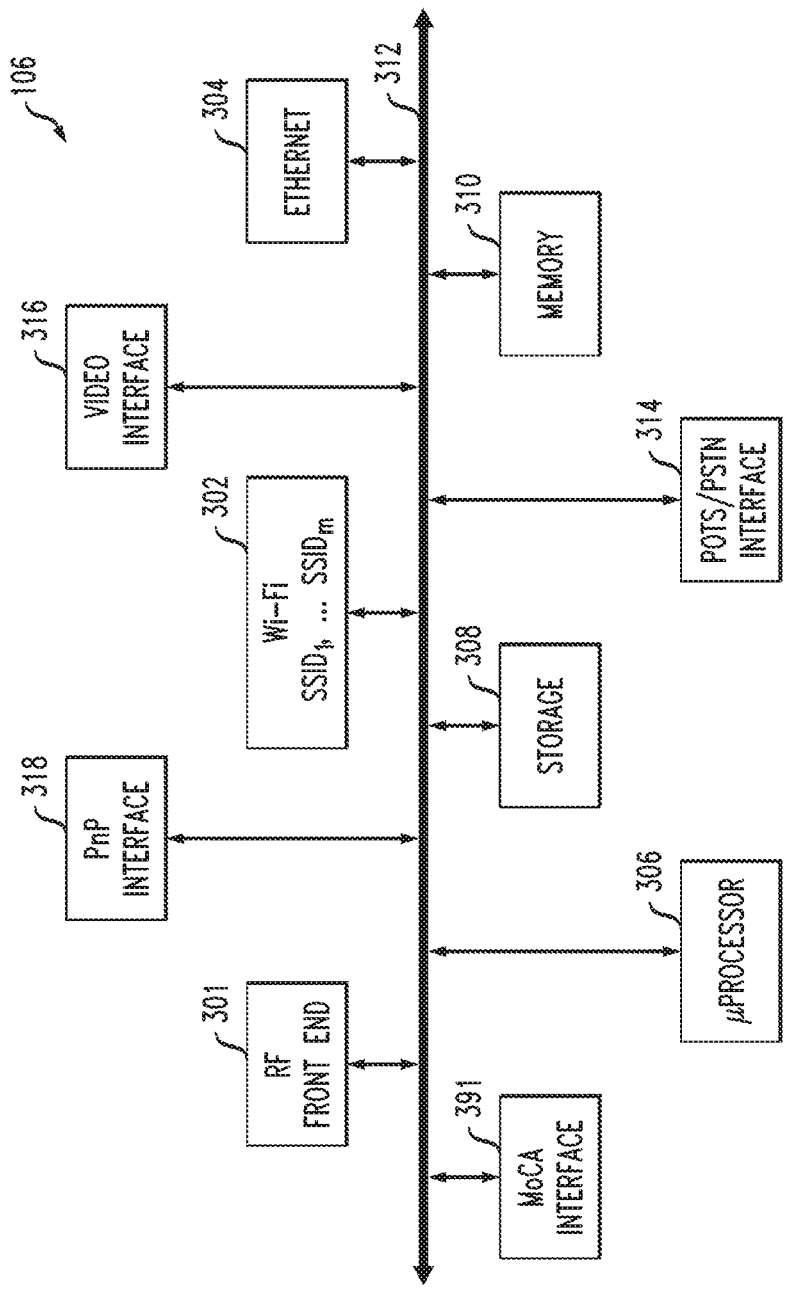
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like. The CPE can also be a Service Optical Network Unit (S-ONU) for FTTH deployment—see FIGS. 8 and 9 and accompanying text.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

It should be noted that some embodiments provide a cloud-based user interface, wherein CPE 106 accesses a user interface on a server in the cloud, such as in NDC 1098.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services. Some embodiments could utilize a cloud-based user interface, wherein CPE 106 accesses a user interface on a server in the cloud, such as in NDC 1098.

In some instances the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments could employ a cloud-based user interface, wherein CPE 106 accesses a user interface on a server in the cloud, such as in NDC 1098. The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

Figure 8:
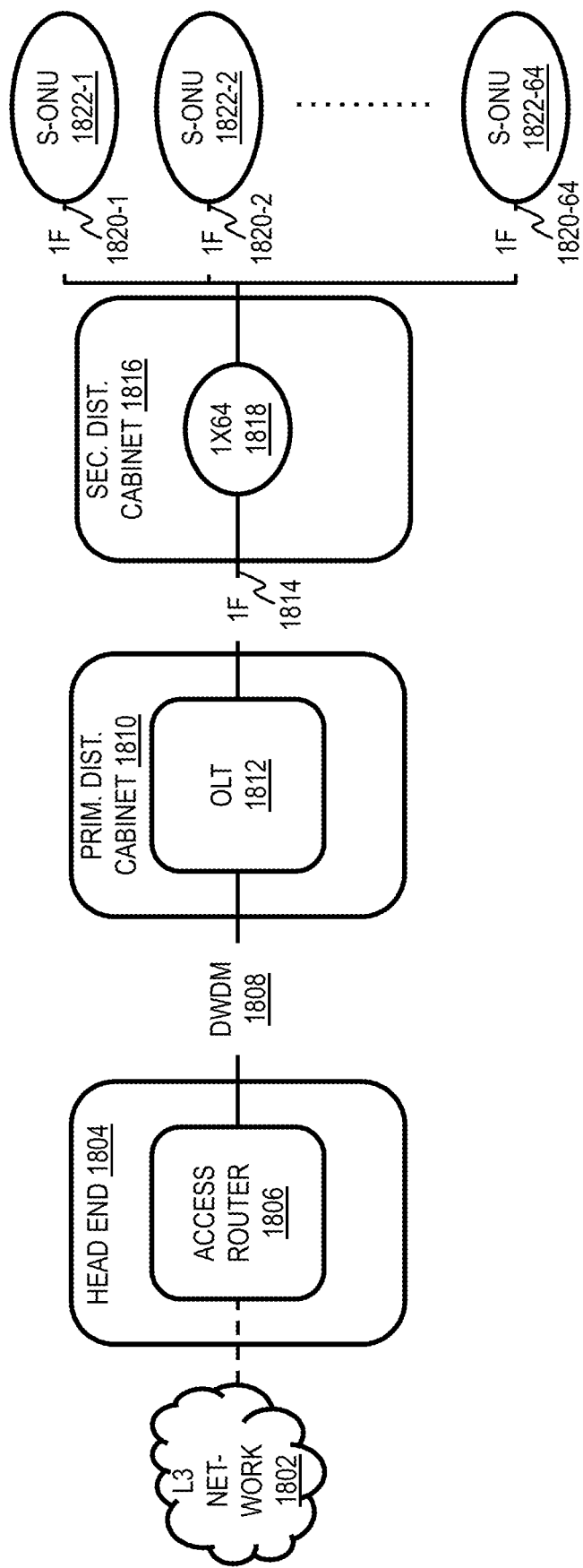
FIG. 8 is a functional block diagram illustrating an exemplary FTTH system, which is one exemplary system within which one or more embodiments could be employed.

As noted, there are also fiber networks for fiber to the home (FTTH) deployments (also known as fiber to the premises or FTTP), where the CPE is a Service ONU (S-ONU; ONU=optical network unit). Referring now to FIG. 8, L3 network 1802 generally represents the elements in FIG. 1 upstream of the head ends 150, while head end 1804, including access router 1806, is an alternative form of head end that can be used in lieu of or in addition to head ends 150 in one or more embodiments. Head end 1804 is suitable for FTTH implementations. Access router 1806 of head end 1804 is coupled to optical line terminal 1812 in primary distribution cabinet 1810 via dense wavelength division multiplexing (DWDM) network 1808. Single fiber coupling 1814 is then provided to a 1:64 splitter 1818 in secondary distribution cabinet 1816 which provides a 64:1 expansion to sixty-four S-ONUs 1822-1 through 1822-64 (in multiple premises) via sixty-four single fibers 1820-1 through 1820-64, it being understood that a different ratio splitter could be used in other embodiments and/or that not all of the 64 (or other number of) outlet ports are necessarily connected to an S-ONU.

Figure 9:
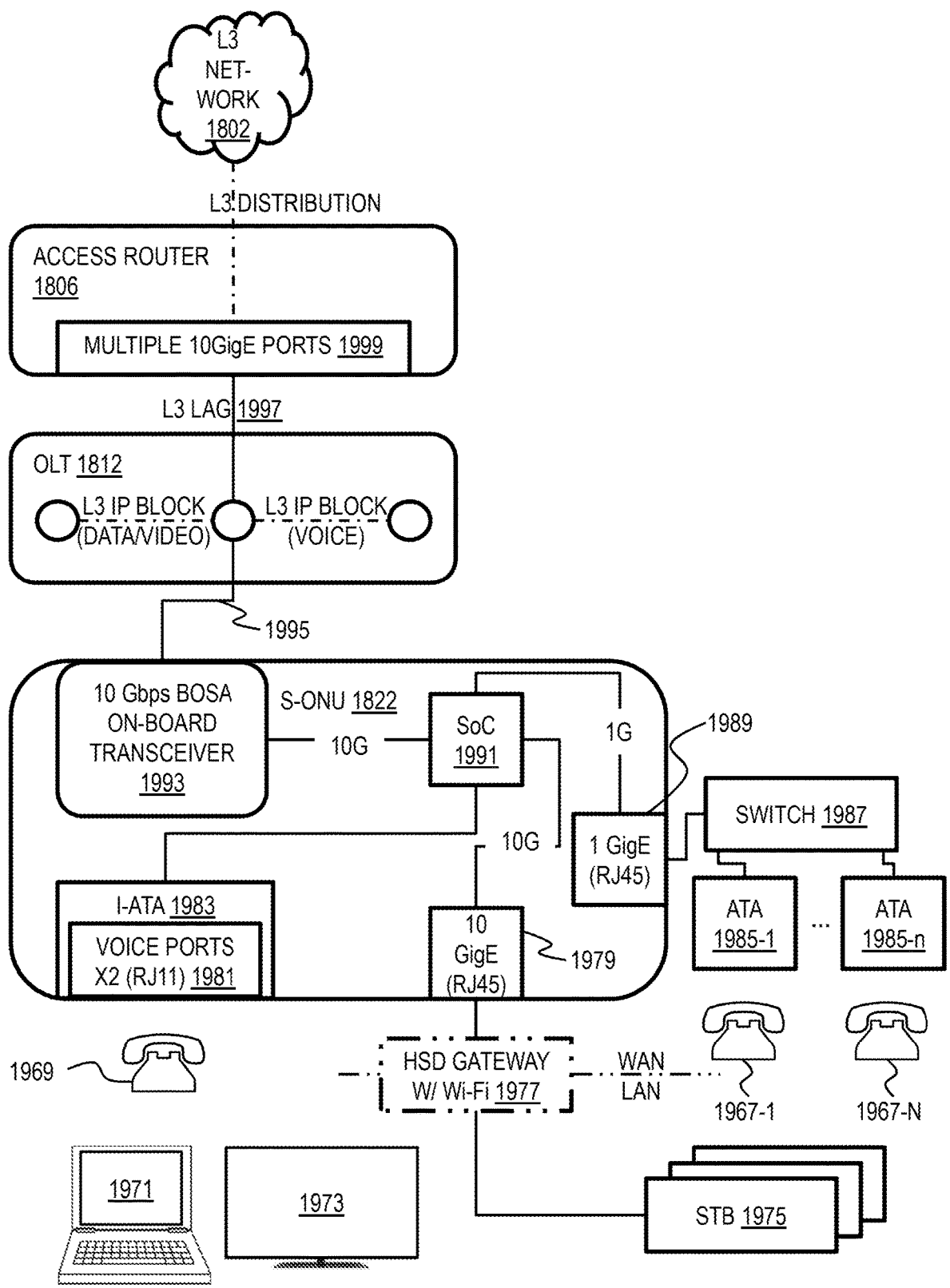
FIG. 9 is a functional block diagram of an exemplary centralized S-ONU CPE unit interfacing with the system of FIG. 8.

Giving attention now to FIG. 9, wherein elements similar to those in FIG. 8 have been given the same reference number, access router 1806 is provided with multiple ten-Gigabit Ethernet ports 1999 and is coupled to OLT 1812 via L3 (layer 3) link aggregation group (LAG) 1997. OLT 1812 can include an L3 IP block for data and video, and another L3 IP block for voice, for example. In a non-limiting example, S-ONU 1822 includes a 10 Gbps bi-directional optical subassembly (BOSA) on-board transceiver 1993 with a 10G connection to system-on-chip (SoC) 1991. SoC 1991 is coupled to a 10 Gigabit Ethernet RJ45 port 1979, to which a high-speed data gateway 1977 with Wi-Fi capability is connected via category 5E cable. Gateway 1977 is coupled to one or more set-top boxes 1975 via category 5e, and effectively serves as a wide area network (WAN) to local area network (LAN) gateway. Wireless and/or wired connections can be provided to devices such as laptops 1971, televisions 1973, and the like, in a known manner. Appropriate telephonic capability can be provided. In a non-limiting example, residential customers are provided with an internal integrated voice gateway (I-ATA or internal analog telephone adapter) 1983 coupled to SoC 1991, with two RJ11 voice ports 1981 to which up to two analog telephones 1969 can be connected. Furthermore, in a non-limiting example, business customers are further provided with a 1 Gigabit Ethernet RJ45 port 1989 coupled to SoC 1991, to which switch 1987 is coupled via Category 5e cable. Switch 1987 provides connectivity for a desired number n (typically more than two) of analog telephones 1967-1 through 1967-n, suitable for the needs of the business, via external analog telephone adapters (ATAs) 1985-1 through 1985-n. The parameter "n" in FIG. 9 is not necessarily the same as the parameter "n" in other figures, but rather generally represents a desired number of units. Connection 1995 can be, for example, via SMF (single-mode optical fiber).

In addition to "broadcast" content (e.g., video programming), the systems of FIGS. 1-6, 8, and 9 can, if desired, also deliver Internet data services using the Internet protocol (IP), although other protocols and transport mechanisms of the type well known in the digital communication art may be substituted. In the systems of FIGS. 1-6, the IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Set Top Box Security Tracking

One or more embodiments provide access to information about a STB. Once developed, software in accordance with one or more embodiments correlates digital access controller data with billing data. Reports can be generated that can identify if a STB is reporting back on an RPD/QPSK port which may be different from the assigned node/port in the billing system (RPD=return path demodulation; QPSK=Quadrature phase-shift keying). Furthermore in this regard, an RPD port can be thought of as a non-physical port comprising an interface of a server application. The RPD port is a logical port which demodulates upstream communications; the physical implementation will depend on the type of upstream communication used. Appropriate specific data items can be added to other tools and can determine if the STB or other CPE was removed from the originating account location (which could be indicative of theft of service or other inappropriate activity). In one or more embodiments, the aforementioned appropriate specific data items can include, for example:

Was the box activated and when?
Where is the box physically located?
Is the box located where it is supposed to be?
Has the box been moved since initial installation?

In one or more embodiments, an appropriate investigation can be undertaken if fraud and/or theft are suspected; if the same is confirmed, the STB can be shut down or some other appropriate action can be taken. Appropriate operational processes are developed in one or more embodiments; for example, dispatching a letter, dispatching a technician, and the like. One or more embodiments make use of existing data, such as the customer's address, billing data, the other equipment assigned to the customer's premises (e.g., cable modem, several STBs, telephone service—can be linked to billing information), the account information, and/or the RPD Node Port. At least some embodiments initially provide reporting and/or reconciliation, prior to taking more drastic action such as a shut down. One or more embodiments provide specific information via other integrations and/or other platforms (e.g., send message to billing and/or customer service platform(s) to make inquiries), and/or potentially initiate one or more actions, depending on operational processes.

One or more embodiments are applicable, for example, to any type of customer with video services which require a digital receiver on the premises connected to the television. Since cable and termination plants are always on, it is possible to physically move a set top box to a different location (address) and connect it to the cable plant; it will work and show the same video services as it did at the legitimate account holder's address. Currently, set top box video equipment within residential and commercial (business) premises do not have "phone home" functions and lack the ability to track the location. One or more embodiments advantageously address these issues in an automated fashion by identifying the originating port birth certificate and comparing it with other equipment port configuration (generally, periodically comparing location (port) of a piece of CPE with its original location (port) and/or locations/ports of other pieces of CPE authorized for the same premises). More specifically, in one non-limiting example, when the set top box is installed, it is assigned to a digital access controller RPD port which connects the device to the plant and services (other types of devices besides digital access controllers and other kinds of ports besides RPD ports are discussed elsewhere herein). When the equipment leaves the originating premises, the port will change. The box can be automatically disabled and/or an investigation can be conducted.

One or more embodiments provide a video theft-of-service detection process which uses media access control (MAC) discovery from the CMTS and information from the biller to create a list of equipment that is eligible for disablement and/or other remedial action. In one or more embodiments, the techniques are vendor-agnostic; i.e., they can be employed with equipment from a variety of different vendors. In one or more embodiments, the aforementioned CMTS is a router which provides layer 1/layer2 termination for cable modems, embedded multimedia terminal adapters (E-MTAs), and DSG equipment. DSG (DOCSIS Settop Gateway) is a specification for delivering data to a cable set top box. The "DOCSIS Set-top Gateway (DSG) Interface Specification" CM-SP-DSG-I25-170906, copyright Cable Television Laboratories, Inc., 2002-2017, dated Sep. 6, 2017, and all earlier versions thereof, are hereby expressly incorporated herein in their entireties for all purposes. A "MAC Domain" is an area in which layer 2 broadcast traffic is bound. A "MAC Domain Downstream Service Group" is a set of downstream channels inside of a MAC Domain. A "MAC Domain Upstream Service Group" is a set of upstream channels inside of a MAC Domain. A "poller" is, for example, a Linux server distributed within an MSO's network in close proximity to the routers and modems with which it communicates. Other operating systems besides Linux could be used in other embodiments.

Figure 10:
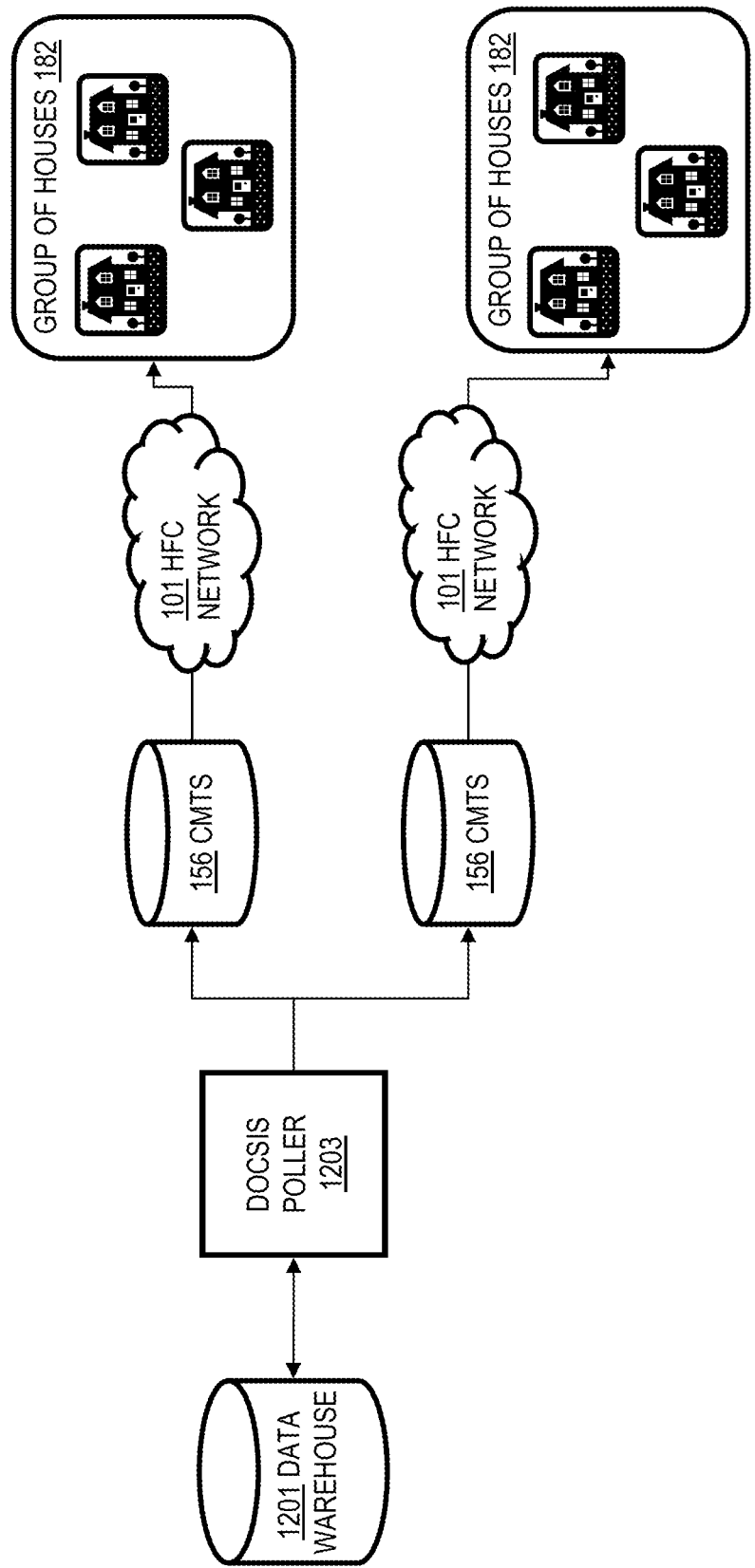
FIG. 10 is a block diagram showing an exemplary discovery process, in accordance with an aspect of the invention.

Referring now to FIG. 10, an exemplary system will include one or more (and typically many) pollers 1203 distributed in the network to reduce latency to the CMTS 156 and cable modems in the premises (e.g. commercial and/or residential). Information from the network is aggregated centrally in a data warehouse 1201. Information from the data warehouse can also be distributed to the poller. Note HFC networks 101 as discussed above servicing service nodes 182 comprising groups of houses (or other premises).

Figure 11:
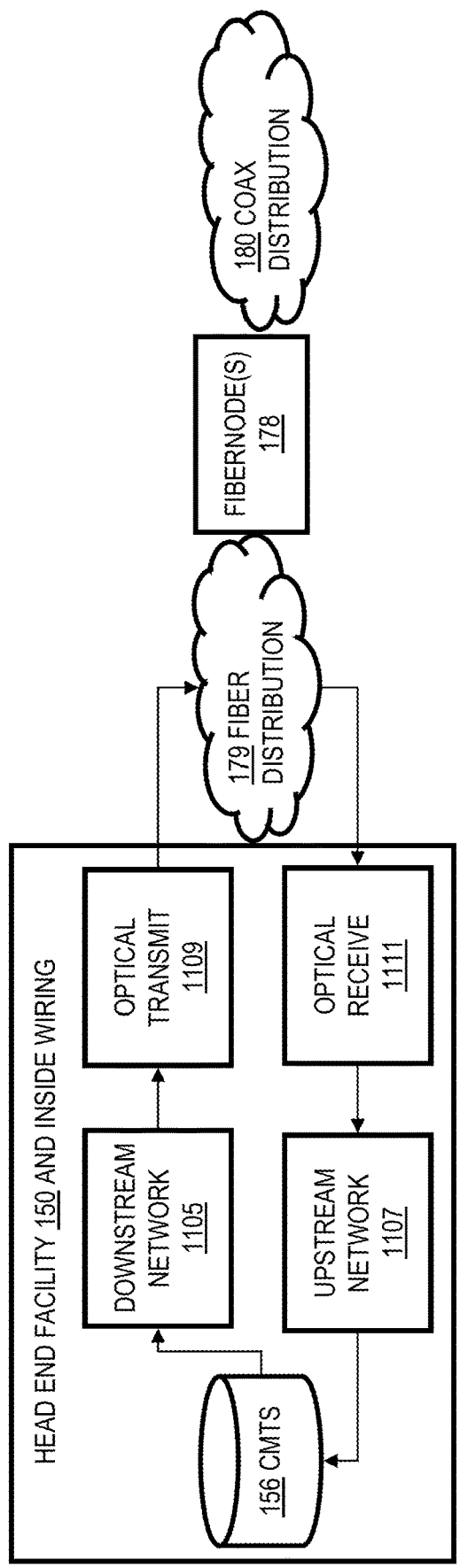
FIG. 11 shows polling within a single node, in accordance with an aspect of the invention.

Referring now also to FIG. 11, the poller 1203 completes discovery of the topology of the fiber network 179 and coaxial network 180 by discovering MAC domain Downstream and Upstream Service groups. In one or more embodiments, the service groups include network elements between the CMTS 156 and the fiber node 178, as well as the logic within the CMTS that interacts with those network elements. The service groups imply wiring topology which delivers service to the customers. A single CMTS 156 may have some number of MAC Domain service groups. A single node 178 is represented in the diagram. Note that downstream network 1105 and optical transmit 1109 correspond to MEM 162 in FIG. 3, while optical receive 1111 and upstream network 1107 correspond to demodulator and splitter 1112 in FIG. 3.

The poller 1203 discovers the CMTS 156 via Simple Network Management Protocol (SNMP), for example. This process takes 1-5 minutes typically. Upon completion, the discovered data is audited against billing data (e.g. from billing system 152). Equipment that should be on the same upstream interface port (as defined herein) but is found to be on a different upstream interface port, is put into an audit list for review or action. Data is stored in a relational database management system (RDMS) or other data warehouse 1201, with the pertinent fields required to review the account and equipment. Discovery can be as granular (detailed) as Upstream Service groups inside of a MAC Domain. For example, a device could have a "macro" change such as being moved to a different CMTS; however, in one or more embodiments, even smaller changes can be detected, such as changing ports on the same CMTS.

Referring to the table of FIG. 12, as discussed further below, equipment from a single account 123123123 is found to be in different MAC Domains, meaning the equipment has moved from the authorized location.

One or more embodiments provide a solution which identifies set-top boxes (STBs) provided as a service to residential customers at their homes. The STBs are identified and an event and/or information is triggered when the box is no longer at the customer's home and has moved outside the home to a different location. Such a use could be a breach of contract or violation of appropriate policies regarding acceptable use for the STB. The customer might, for example, move the box to another location and use the services there. One or more embodiments advantageously employ existing devices in an existing video plant to create a fingerprint at the time of installation.

The finger print is created as follows in one or more embodiments. When the devices are provisioned and are activated, they are provisioned and activated on a certain port within a certain RPD (Return Path Demodulator Port) that has been identified. In one or more embodiments, the other devices in the person's home are compared. If other set-top boxes and/or other devices are on the same port, and one piece of equipment is later found to no longer be on that port, it can be inferred that the given piece of equipment is no longer at that same location. This suggests some type of theft of services, or that the device was moved to another location outside the MSO's acceptable use policy.

In one or more embodiments, the ports are located on the digital access controllers (DACs). They may also be located on other devices such as the CMTS or the like. In a non-limiting example, the ports can be located on an ARRIS/Motorola Advanced Return Path Demodulator (ARPD) (one non-limiting example of a demodulator 1112), a Cisco Demodulator (another non-limiting example of a demodulator 1112), and/or on the CMTS 156.

Refer again to FIG. 10, which shows an exemplary high-level discovery process, according to an aspect of the invention. Information is stored in data warehouse 1201. DOCSIS poller 1203 polls all the DOCSIS devices. In one or more embodiments, the STBs are DOCSIS-capable. High-speed data modems and/or telephone MTA (multimedia terminal adapter) modems can also be polled in one or more embodiments. During DOCSIS polling, the individual DOCSIS devices are polled and a number of different measurements are taken at the time of the polling. In a non-limiting example, this can be done 12-15 times per day for each device across the enterprise. This serves as a health check to verify that each device is working properly, is within spec, etc. Other types of reporting can be undertaken, not necessarily part of one or more embodiments, to identify bad spots, bad devices, bad plant, etc. which could result in bad service to customers. Such information is discovered through this automatic polling process, which looks up through the CMTS and follows the HFC network. The poller sees which device(s) is/are registered to the CMTS. This information is collected and can advantageously be used to identify other things (e.g., those locations where technicians should focus their work; conditions of end-device batteries; indeed, condition of SNMP end devices in general).

The poller 1203 performs a discovery on the CMTS 156 and learns which modems are on which ports. As will be familiar to the skilled artisan, the CMTS typically includes a plurality of line cards with coaxial ports; the coax is typically converted to fiber between the CMTS and network 101. The communication from all of the devices (CPE 106) comes back in through those ports on the CMTS (in one or more embodiments it should be noted that if desired, in addition to performing media conversion, the CMTS can run routing protocols). The CMTS is in a head end, in one or more embodiments. HFC networks and service groups are known to the skilled artisan. Poller 1203 is collocated in the head end 150 with the CMTS in one or more embodiments. Data warehouse 1201 is located in a national data center 1098 in one or more embodiments.

Thus, in one or more embodiments, during the discovery process, it is determined which CMTS line card ports certain devices in a house (or other subscriber premises) are connected to. So, from prior discovery, a database in data warehouse 1201 will know that a certain CPE was activated, as well as what port it was activated on. Periodically (e.g., once a day), the information gathered at the time of installation is compared to current information (with regard to the port the CPE device is registered to), thus permitting investigation when it is determined that a piece of CPE has been moved. In one or more embodiments, it is recommended that an appropriate investigation (e.g., telephone call, technician visit) be undertaken before any remedial action such as termination of service is contemplated—for example, a piece of CPE may have been moved innocently.

Refer now to FIG. 11, note head end facility 150 and inside wiring, including CMTS 156; downstream and upstream ports 1105, 1107, respectively; optical transmitters and optical receivers 1109, 1111, respectively; and the fiber distribution 179, node 178, and coaxial distribution 180 as discussed above. A "node" 178 as depicted in FIG. 11 comprises a group of devices supporting a neighborhood of between 500-700 homes, for example. A subscriber's account can be associated to a specific node. So, head end 150 is shown connected to only one fiber node 178 serving a single neighborhood, but in fact will be connected to many such nodes serving many neighborhoods—see FIG. 4.

The table of FIG. 12 shows data from a poller discovering a CMTS using SNMP. The process may take, for example, 1-5 minutes. Upon completion, the discovered data is audited against billing data and equipment that should be in the same MAC domain. As described before, upon installation or taking a snapshot/image of a given house/residence or other premises, and all the devices in the house/residence or other premises, suppose they are all in the market area (MA) "California"; the InterNode is "outer market"; the Poll Time is listed, as are the associated MAC addresses, CMTS, and interface description "IFDESCR" on which the given device is installed (e.g., "cable-mac 55" or "cable-mac 48"). In the example of the table of FIG. 12, all the devices are set-top boxes and they are all associated to the same account number "123123123." It is determined that "cable-mac 55" is not collocated with "cable-mac 48." That is to say, it is suspected that the piece of hardware with the MAC address "001C115D46A4" has been moved from its authorized location.

Heretofore, dealing with mis-located STBs has typically relied on human reporting, rather than software—merely plugging in an STB does not currently cause it to "phone home" or give its GPS coordinates. Some prior art approaches have employed DOCSIS timing offset to attempt to locate boxes; such techniques are not always reliable. There is a long-felt need in the industry to deal with the issue of improper relocation of CPE.

Recapitulation

Given the discussion thus far, and with attention again to FIGS. 10-12, it will be appreciated that, in general terms, an exemplary method, according to an aspect of the invention, includes periodically polling (e.g., with DOCSIS poller 1203) a plurality of customer premises equipment devices in a broadband network to determine a corresponding upstream interface port for each of the plurality of customer premises equipment devices (e.g. 106, 1822). As used herein, a "corresponding upstream interface port" includes a port, corresponding to the CPE device, located on a CMTS or digital video access equipment or the like. A non-limiting example of digital video access equipment is a DAC (Digital Addressable Controller or Digital Access Controller) 163. Non-limiting examples of different types of ports include coaxial ports, RPD (return path demodulator) ports, CMTS line card ports, QPSK ports, and the like. One non-limiting example of a DAC is the Digital Addressable Controller DAC6000 available from ARRIS International plc of Suwanee, Ga., US. Different vendors of set-top boxes will have different types of digital video access equipment for use in the head end. Furthermore regarding upstream interface ports, some embodiments consider the MAC domain; further, in some instances, a piece of CPE could be on the right CMTS but on the wrong interface. Please note that DAC 163 can be located at any suitable place in head end 150; the depicted location between the VOD server 105 and MEM 162 is exemplary and non-limiting.

A further step includes comparing (e.g. with logic on poller 1203) the determined corresponding upstream interface ports for each of the plurality of customer premises equipment devices to stored data (e.g., in data warehouse 1201) indicating authorized upstream interface ports for each of the plurality of customer premises equipment devices. An even further step includes, responsive to the comparing indicating that at least one of the determined corresponding upstream interface ports does not match a corresponding one of the authorized upstream interface ports, taking at least one remedial action for a customer account associated with a corresponding one of the customer premises equipment devices in the content network. As noted, various types of remedial actions can be taken for the customer account associated with the corresponding one of the customer premises equipment devices in the content network; for example, disabling the corresponding one of the customer premises equipment devices. However, also noted, it is preferable that a suitable investigation be undertaken prior to any disabling of equipment; thus, in one or more embodiments, the step of taking the at least one remedial action for the customer account associated with the corresponding one of the customer premises equipment devices in the content network includes listing the corresponding one of the customer premises equipment devices in a computerized audit list for follow-up. Follow-up can include sending a letter, initiating a customer service representative (CSR) telephone call, initiating a technician visit, etc. In a non-limiting example, upon the comparing step indicating that at least one of the determined corresponding upstream interface ports does not match a corresponding one of the authorized upstream interface ports, data is placed in a queue and then fed to the billing system 152, which sets a flag in the billing system to cause (where appropriate after an investigation or the like) termination of service to the account with the inappropriately moved CPE.

In a non-limiting example, in the periodic polling step, the corresponding upstream interface ports reside on a cable modem termination system 156 (the corresponding upstream interface ports could also reside, for example, on digital video access equipment, as discussed elsewhere herein).

As noted, the polling step could include polling with a poller; the poller 1203 could be a DOCSIS poller and could be located upstream from the cable modem termination system 156 as seen in FIG. 10.

In a non-limiting example, the polling includes polling via Simple Network Management Protocol (SNMP). In one or more embodiments, the poller 1203 runs Network management station (NMS) and/or SNMP Element Manager software; the CPE and CMTS units are managed devices running agents. Managed devices and agents are used in the sense commonly used with reference to SNMP: Each managed device executes a software component called an agent which reports information via SNMP to the manager; managed devices are network nodes that implements an SNMP interface that allows unidirectional (read-only) or bidirectional (read and write) access to node-specific information. One or more embodiments employ the UNIX operating system server platform to develop custom scripts; scripts can be written in, e.g., the "Perl" programming language and/or the "Go" programming language.

In one or more embodiments, in the polling step, the customer premises equipment devices include DOCSIS-compliant set-top boxes.

As noted, in one or more embodiments, in the comparing step, the stored data resides in a data warehouse 1201 upstream of the poller 1203. Non-limiting examples of suitable databases include Oracle/MySQL and Hadoop. Non-limiting examples of suitable transport protocols include RabbitMQ and SFTP (secure file transport protocol).

In one or more embodiments, a further step includes populating a data warehouse 1201 with the stored data indicating the authorized upstream interface ports for each of the plurality of customer premises equipment devices, during original provisioning of the plurality of customer premises equipment devices. One or more embodiments use a combination of an automated discovery tool and human intervention during the original provisioning/set-up/service activation process. A customer service representative can populate manually and/or be aided by suitable software tools. The skilled artisan, given the teachings herein, will be able to populate database 1201 during provisioning of a premises with one or more CPE.

Thus, in one or more embodiments, the comparison is between the current upstream interface port for a piece of CPE and its original port at provisioning. In another aspect, the comparing further includes comparing the determined corresponding upstream interface ports for each of the plurality of customer premises equipment devices to determined corresponding upstream interface ports for ones of the plurality of customer premises equipment devices previously collocated therewith (e.g., in the same premises and on the same account). That is to say, the current upstream interface port for a piece of CPE can be compared to the current upstream interface port(s) for one or more other pieces of CPE that were originally collocated with it (e.g., at provisioning).

Thus, some embodiments check current ports against authorized ports (e.g. port on which originally provisioned); some embodiments check whether a CPE unit is no longer on the same port as other CPE units on the same account; and some embodiments do both. One or more embodiments continually discover current locations (ports) of CPE; determine what port a given premises is supposed to be on, and also check to see if equipment from that premises/account is on more than one port.

Advantageously, one or more embodiments can be implemented without the need for monitoring a heartbeat signal (i.e. signals indicating continuity of the connection) from the corresponding one of the customer premises equipment devices in the content network. Furthermore, advantageously, one or more embodiments can be implemented in CPE units that do not include a point-of-deployment module. In the cable industry, a point-of-deployment (POD) module (also known as a "CableCARD™") was developed to satisfy certain security requirements to allow retail availability of host devices, e.g., set-top boxes, digital cable ready televisions, digital video recorders, personal computers (PCs), integrated digital televisions, and the like, for receiving cable services. The POD module, comprising a PCMCIA (Personal Computer Memory Card International Association) device, can be inserted into a host device, allowing a viewer to receive cable systems' secure digital video services, e.g., pay per view TV, electronic program guides, premium subscription channels, video-on-demand (VOD) services, etc.

As noted, in the periodic polling step, the corresponding upstream interface ports could be one or more of coaxial ports, return path demodulator (RPD) ports, cable modem termination system (CMTS) line card ports, and quadrature phase-shift keying (QPSK) ports.

In another aspect, an exemplary poller 1203 includes a memory (e.g. 730), at least one processor (e.g. 720) coupled to the memory, and a non-transitory computer readable medium including computer executable instructions (e.g. one or more software and/or firmware modules) which when loaded into the memory configure the at least one processor to cause the at least one processor to be operative to carry out or otherwise facilitate any one, some or all of the method steps described herein in connection with any of the methods described herein.

In still another aspect, an exemplary system includes a data warehouse 1201; a plurality of ported units each comprising at least one of a cable modem termination system and digital video access equipment; and a poller 1203, similar to that just described, downstream of the data warehouse and upstream of the plurality of ported units. The poller is configured to carry out or otherwise facilitate any one, some or all of the method steps described herein in connection with any of the methods described herein, in cooperation with the other elements, as described. A "ported unit comprising at least one of a cable modem termination system and digital video access equipment" means a unit having upstream interface ports as described herein, which unit includes a cable modem termination system and/or digital video access equipment.

As noted, some embodiments detect CPE units that are on the same account but not all on the same port—there is an account with associated equipment and the ports for all the equipment associated with that account are compared. If the ports are not all the same, the account is flagged. A data structure associated with an account specifies the associated CPE units for that account; the poller detects when all the boxes are not collocated on the same port.

Accordingly, in a further aspect, an exemplary method includes the step of periodically polling (e.g., with DOCSIS poller 1203) a plurality of customer premises equipment devices in a broadband network to determine a corresponding upstream interface port for each of the plurality of customer premises equipment devices (e.g. 106, 1822). A further step includes comparing the determined corresponding upstream interface ports for each of the plurality of customer premises equipment devices to determined corresponding upstream interface ports for one or more of the plurality of customer premises equipment devices previously collocated therewith under a common account. That is to say, e.g., logic in poller 1203 compares the current port for a particular piece of CPE to the current ports for other pieces of CPE on the same account—this data may be stored, for example, in data warehouse 1201 and/or obtained from a data structure in billing system 152. An even further step includes, responsive to the comparing indicating that at least one of the determined corresponding upstream interface ports does not match the determined corresponding upstream interface ports for one or more of the plurality of customer premises equipment devices previously collocated therewith under the common account, taking at least one remedial action for a customer account associated with a corresponding one of the customer premises equipment devices in the broadband network. As noted, various types of remedial actions can be taken.

In one or more embodiments, in the periodic polling step, the corresponding upstream interface ports reside on at least one of a cable modem termination system and digital video access equipment.

In some cases, the polling step includes polling with a poller 1203 located upstream from the at least one of a cable modem termination system and digital video access equipment (e.g. 156); and, in the periodic polling step, the corresponding upstream interface ports include at least one of coaxial ports, return path demodulator (RPD) ports, cable modem termination system (CMTS) line card ports, and quadrature phase-shift keying (QPSK) ports.

As noted, the polling can be carried out, for example, via Simple Network Management Protocol (SNMP).

As also noted, the customer premises equipment devices can be, for example, DOCSIS-compliant set-top boxes.

In some instances, the comparing step further includes accessing stored data residing in a data warehouse 1201 upstream of the poller. The stored data indicates, for each of the plurality of customer premises equipment devices, those of the plurality of customer premises equipment devices previously collocated therewith under the common account. Some embodiments further include populating the data warehouse with the stored data indicating the authorized upstream interface ports for each of the plurality of customer premises equipment devices, during original provisioning of the plurality of customer premises equipment devices.

As noted, one or more embodiments can advantageously be carried out without monitoring a heartbeat signal from the corresponding one of the customer premises equipment devices in the broadband network.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

Figure 7:
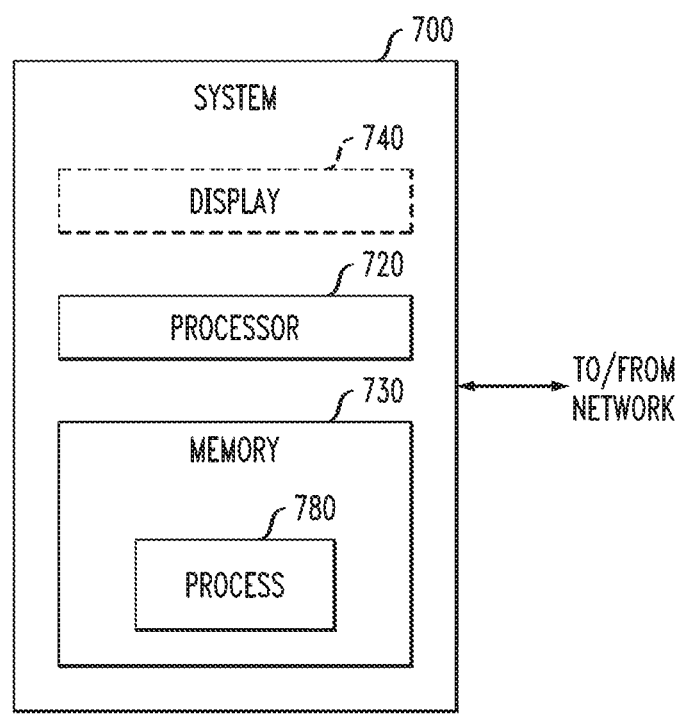
FIG. 7 is a block diagram of a computer system useful in connection with one or more aspects of the invention.

FIG. 7 is a block diagram of a system 700 that can implement at least some aspects of the invention, and is representative, for example, of one or more of the servers shown in the figures, as well as functionality of the poller 1203. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors. In one or more embodiments, the poller is implemented as software running on a hardware server (which in general can be virtualized or not virtualized); in a non-limiting example, the UNIX operating system is employed.

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC or via a field-programmable gate array (FPGA) rather than using firmware. Display 740 is representative of a variety of possible input/output devices (e.g., keyboards, mice, and the like). Every processor (e.g. those of pollers or servers) may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 700 or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal. Also, a "non-transitory computer readable medium" expressly excludes a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network. Furthermore, memory can include memory on the processor chip, volatile memory such as RAM coupled thereto, and non-volatile memory such as a non-transitory computer readable medium comprising computer executable instructions which when loaded into the RAM or on-chip memory configure the processor(s) to carry out aspects of the invention.

Accordingly, it will be appreciated that one or more embodiments of the present invention can include a computer program product comprising computer program code means adapted to perform one or all of the steps of any methods or claims set forth herein when such program is run, for example, on a virtualized or non-virtualized hardware server implementing one or more of the poller 1203, database 1201, and that such program may be embodied on a tangible computer readable recordable storage medium. A program (e.g., agent) can also run on a processor 306 of CPE 106 (or processor of SoC 1991), a processor of a CMTS or similar device, etc. As used herein, including the claims, unless it is unambiguously apparent from the context that only server software is being referred to, a "server" includes a physical data processing system (for example, system 700 as shown in FIG. 7) running one or more server programs. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. modules/sub-modules to implement blocks/sub-blocks 1201, 1203, agents on monitored devices, etc). The method steps can then be carried out using the distinct software modules of the system, as described above, executing on one or more hardware processors (e.g., one or more hardware processors of server(s) implementing one or more of the poller 1203, database 1201 and one or more hardware processors of an STB or other CPE 106 (or processor of SoC 1991), as well as one or more hardware processors of a CMTS or the like). Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
    periodically polling a plurality of customer premises equipment devices in a broadband network to determine a corresponding upstream interface port for each of said plurality of customer premises equipment devices;
    comparing said determined corresponding upstream interface ports for each of said plurality of customer premises equipment devices to stored data indicating authorized upstream interface ports for each of said plurality of customer premises equipment devices; and
    responsive to said comparing indicating that at least one of said determined corresponding upstream interface ports does not match a corresponding one of said authorized upstream interface ports and indicating that a plurality of the customer premises equipment devices associated with a common premises or common account have non-common upstream interface ports, taking at least one remedial action for a customer account associated with a corresponding one of said customer premises equipment devices in said broadband network, said remedial action comprising disabling said corresponding one of said customer premises equipment devices.

2. The method of claim 1, wherein, in said periodic polling step, said corresponding upstream interface ports reside on a cable modem termination system.

3. The method of claim 2, wherein said polling step comprises polling with a poller located upstream from said cable modem termination system.

4. The method of claim 3, wherein said polling comprises polling via Simple Network Management Protocol (SNMP).

5. The method of claim 4, wherein, in said polling step, said customer premises equipment devices comprise DOCSIS-compliant set-top boxes.

6. The method of claim 3, wherein, in said comparing step, said stored data resides in a data warehouse upstream of said poller.

7. The method of claim 1, wherein said step of taking said at least one remedial action for said customer account associated with said corresponding one of said customer premises equipment devices in said broadband network comprises listing said corresponding one of said customer premises equipment devices in a computerized audit list for follow-up.

8. The method of claim 1, further comprising populating a data warehouse with said stored data indicating said authorized upstream interface ports for each of said plurality of customer premises equipment devices, during original provisioning of said plurality of customer premises equipment devices.

9. The method of claim 1, wherein said steps are carried out without monitoring a heartbeat signal from said corresponding one of said customer premises equipment devices in said broadband network.

10. The method of claim 1, wherein, in said periodic polling step, said corresponding upstream interface ports reside on digital video access equipment.

11. The method of claim 1, wherein, in said periodic polling step, said corresponding upstream interface ports comprise at least one of coaxial ports, return path demodulator (RPD) ports, cable modem termination system (CMTS) line card ports, and quadrature phase-shift keying (QPSK) ports.

12. The method of claim 1, wherein said comparing further comprises comparing said determined corresponding upstream interface ports for each of said plurality of customer premises equipment devices to determined corresponding upstream interface ports for one or more of said plurality of customer premises equipment devices previously collocated therewith.

13. A poller comprising:
a memory;
at least one processor, coupled to said memory; and
non-transitory computer readable medium comprising computer executable instructions which when loaded into said memory configure said at least one processor to cause the at least one processor to be operative to:
periodically poll a plurality of customer premises equipment devices in a broadband network to determine a corresponding upstream interface port for each of said plurality of customer premises equipment devices;
compare said determined corresponding upstream interface ports for each of said plurality of customer premises equipment devices to stored data indicating authorized upstream interface ports for each of said plurality of customer premises equipment devices; and
responsive to said comparing indicating that at least one of said determined corresponding upstream interface ports does not match a corresponding one of said authorized upstream interface ports and indicating that a plurality of the customer premises equipment devices associated with a common premises or common account have non-common upstream interface ports, take at least one remedial action for a customer account associated with a corresponding one of said customer premises equipment devices in said broadband network, said remedial action comprising disabling said corresponding one of said customer premises equipment devices.

14. The poller of claim 13, wherein said corresponding upstream interface ports reside on a cable modem termination system downstream of said poller.

15. The poller of claim 14, wherein said at least one processor is operative to poll via Simple Network Management Protocol (SNMP).

16. The poller of claim 14, wherein said at least one processor is operative to obtain said stored data from a data warehouse upstream of said poller.

17. A system comprising:
a data warehouse;
a plurality of ported units each comprising at least one of a cable modem termination system and digital video access equipment; and
a poller downstream of said data warehouse and upstream of said plurality of ported units, said poller in turn comprising:
a memory;
at least one processor, coupled to said memory; and
non-transitory computer readable medium comprising computer executable instructions which when loaded into said memory configure said at least one processor to cause the at least one processor to be operative to:
periodically poll a plurality of customer premises equipment devices in a broadband network to determine a corresponding upstream interface port on one of said plurality of ported units for each of said plurality of customer premises equipment devices;
compare said determined corresponding upstream interface ports for each of said plurality of customer premises equipment devices to stored data in said data warehouse, said stored data indicating authorized upstream interface ports for each of said plurality of customer premises equipment devices; and
responsive to said comparing indicating that at least one of said determined corresponding upstream interface ports does not match a corresponding one of said authorized upstream interface ports and indicating that a plurality of the customer premises equipment devices associated with a common premises or common account have non-common upstream interface ports, take at least one remedial action for a customer account associated with a corresponding one of said customer premises equipment devices in said broadband network, said remedial action comprising disabling said corresponding one of said customer premises equipment devices.

18. The system of claim 17, wherein said wherein said at least one processor is operative to poll via Simple Network Management Protocol (SNMP).

19. A method comprising the steps of:
periodically polling a plurality of customer premises equipment devices in a broadband network to determine a corresponding upstream interface port for each of said plurality of customer premises equipment devices;
comparing said determined corresponding upstream interface ports for each of said plurality of customer premises equipment devices to determined corresponding upstream interface ports for one or more of said plurality of customer premises equipment devices previously collocated therewith under a common account; and
responsive to said comparing indicating that at least one of said determined corresponding upstream interface ports does not match said determined corresponding upstream interface ports for one or more of said plurality of customer premises equipment devices previously collocated therewith under said common account and indicating that a plurality of the customer premises equipment devices associated with a common premises or said common account have non-common upstream interface ports, taking at least one remedial action for a customer account associated with a corresponding one of said customer premises equipment devices in said broadband network, said remedial action comprising disabling said corresponding one of said customer premises equipment devices.

20. The method of claim 19, wherein, in said periodic polling step, said corresponding upstream interface ports reside on at least one of a cable modem termination system and digital video access equipment.

21. The method of claim 20, wherein said polling step comprises polling with a poller located upstream from said at least one of a cable modem termination system and digital video access equipment; and wherein, in said periodic polling step, said corresponding upstream interface ports comprise at least one of coaxial ports, return path demodulator (RPD) ports, cable modem termination system (CMTS) line card ports, and quadrature phase-shift keying (QPSK) ports.

22. The method of claim 21, wherein said polling comprises polling via Simple Network Management Protocol (SNMP).

23. The method of claim 22, wherein, in said polling step, said customer premises equipment devices comprise DOCSIS-compliant set-top boxes.

24. The method of claim 23, wherein said comparing step further comprises accessing stored data residing in a data warehouse upstream of said poller, said stored data indicating, for each of said plurality of customer premises equipment devices, those of said plurality of customer premises equipment devices previously collocated therewith under said common account.

25. The method of claim 19, wherein said steps are carried out without monitoring a heartbeat signal from said corresponding one of said customer premises equipment devices in said broadband network.

26. A poller comprising:
a memory;
at least one processor, coupled to said memory; and
non-transitory computer readable medium comprising computer executable instructions which when loaded into said memory configure said at least one processor to cause the at least one processor to be operative to:
periodically poll a plurality of customer premises equipment devices in a broadband network to determine a corresponding upstream interface port for each of said plurality of customer premises equipment devices;
compare said determined corresponding upstream interface ports for each of said plurality of customer premises equipment devices to determined corresponding upstream interface ports for one or more of said plurality of customer premises equipment devices previously collocated therewith under a common account and indicating that a plurality of the customer premises equipment devices associated with a common premises or said common account have non-common upstream interface ports; and
responsive to said comparing indicating that at least one of said determined corresponding upstream interface ports does not match said determined corresponding upstream interface ports for one or more of said plurality of customer premises equipment devices previously collocated therewith under said common account, take at least one remedial action for a customer account associated with a corresponding one of said customer premises equipment devices in said broadband network, said remedial action comprising disabling said corresponding one of said customer premises equipment devices.

27. The poller of claim 26, wherein said corresponding upstream interface ports reside on at least one of a cable modem termination system and digital video access equipment downstream of said poller.

28. The poller of claim 27, wherein said at least one processor is operative to compare by accessing stored data residing in a data warehouse upstream of said poller, said stored data indicating, for each of said plurality of customer premises equipment devices, those of said plurality of customer premises equipment devices previously collocated therewith under said common account.

29. A system comprising:
a data warehouse;
a plurality of ported units each comprising at least one of a cable modem termination system and digital video access equipment; and
a poller downstream of said data warehouse and upstream of said plurality of ported units, said poller in turn comprising:
a memory;
at least one processor, coupled to said memory; and
non-transitory computer readable medium comprising computer executable instructions which when loaded into said memory configure said at least one processor to cause the at least one processor to be operative to:
periodically poll a plurality of customer premises equipment devices in a broadband network to determine a corresponding upstream interface port on one of said plurality of ported units for each of said plurality of customer premises equipment devices;
compare said determined corresponding upstream interface ports for each of said plurality of customer premises equipment devices to determined corresponding upstream interface ports for one or more of said plurality of customer premises equipment devices previously collocated therewith under a common account; and
responsive to said comparing indicating that at least one of said determined corresponding upstream interface ports does not match said determined corresponding upstream interface ports for one or more of said plurality of customer premises equipment devices previously collocated therewith under said common account and indicating that a plurality of the customer premises equipment devices associated with a common premises or said common account have non-common upstream interface ports, take at least one remedial action for a customer account associated with a corresponding one of said customer premises equipment devices in said broadband network, said remedial action comprising disabling said corresponding one of said customer premises equipment devices.

30. The system of claim 29, wherein said wherein said at least one processor is operative to poll via Simple Network Management Protocol (SNMP).

* * * * *